United States Patent Office 3,369,005
Patented Feb. 13, 1968

3,369,005
COPOLYMERS OF OLEFINES WITH
TRITHIANES
Janine Ourgaud, Paris, France, assignor to Societe
Nationale des Petroles d'Aquitaine, Courbevoie,
France
No Drawing. Filed May 27, 1966, Ser. No. 553,271
Claims priority, application France, June 9, 1965,
20,033
10 Claims. (Cl. 260—79.5)

ABSTRACT OF THE DISCLOSURE

The present invention relates to polymers of olefines particularly α-olefines, with unsaturated trithianes possesing the formula

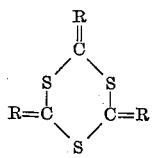

wherein R represents an alkylidene group having from 1 to 6 carbon atoms. The invention more particularly is directed to polymers of ethylene, an aliphatic α-olefine having a formula R—CH=CH$_2$, where R represents an alkyl containing from 1 to 6 carbon atoms and a trithiane having the aforementioned formula. The polymers of the invention possess high molecular weight, are practically linear, are amorphous, unsaturated and vulcanizable. The polymers of the invention are prepared by polymerizing a mixture of an olefine with an unsaturated trithiane having the above formula at a temperature ranging from about —80° C. to 110° C. in the presence of a Ziegler type catalyst. Preferably the trithiane is present in said mixture in a molar proportion of from 0.1 to 20 mole percent.

Background of the invention

It is known to prepare rubber-like copolymers from ethylene and α-olefines, for example, from ethylene and propylene, but these materials have the disadvantage of being difficult to vulcanise, because of their saturation. In order to obtain elastomers which can be vulcanised by the usual means, it is necessary for the molecule to have a certain degree of unsaturation. The process of the present invention does in fact produce copolymers, which possess a degree of unsaturation sufficient for conventional vulcanisation with sulphur to be possible in much the same way as vulcanisation by means of free radical formers, particularly peroxides.

The process according to the invention makes it possible to obtain elastomers which still preserve the beneficial properties of the rubbers of the ethylene-propylene type, that is they possess an exceptional resistance to ozone, bad weather influences, heat and chemical agents, in combination with good mechanical properties. These advantages are obtained by virtue of the choice of the constituent which supplies the unsaturation and also the well-estimated proportion of this constituent in the copolymer. From this latter point of view, the products according to the invention have particularly interesting qualities, when there is at least one double bond for 50 ethylene-α-olefine units, particularly for 50 ethylene-propylene units. On the other hand, the process of the invention makes it possible for the unsaturation to be distributed very regularly in the terpolymer, which makes possible the complete and uniform cross-linking of the molecules during the vulcanisation reaction. Actually, the invention leads to terpolymers which, before vulcanisation, are characterised by a practically amorphous state, which indicates a random distribution of the monomers and an absence of sequences of the same monomer. Because of these qualities, the new copolymers, once vulcanised, give interesting products which can be used for the manufacture of articles such as electric cables, conveyor belts, tubes, sheaths and pneumatic tires.

The new process consists in copolymerising ethylene with one or more α-olefines, more particularly propylene, and a certain proportion of an unsaturated trithiane, in the presence of a catalyst of Ziegler type.

The unsaturated trithianes capable of being used according to the invention can have the following general formula:

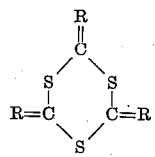

In these trialkylidene trithianes, R is a more or less long linear or branched hydrocarbon chain. More particularly it contains 1 to 6 carbon atoms, that is, the lightest R is a methylene —CH$_2$—.

Two non-limiting examples of unsaturated trithianes which correspond to the Formula 1 and 2 are 2,4,6-triethylidene-1,3,5-trithiane

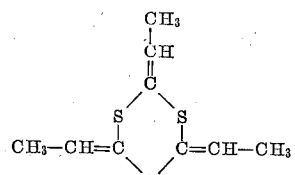  (1)

and 2,4,6-trimethylene trithiane

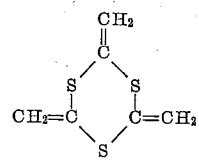  (2)

These trienic trithianes can be homopolymerised or copolymerised with ethylene alone or in admixture with an α-olefine.

In the copolymerisation with the olefines in accordance with the invention, at least one of the double bonds of the trithiane participates in the copolymerisation reaction, while the other double bond or bonds remain available for the subsequent reactions, particularly for the cross-linking.

The copolymerisation according to the invention is catalysed by the known systems comprising an alkylated compound of one or more metals of Groups I, II or III of the Periodic System of the Elements (A) and a halogenated compound of a transition metal of one of the Groups IV, V or VI(B). Such catalytic systems, formed for example by aluminium alkyls and halides, of Vi, Zr, V, Mo, W, etc., have been described by way of example in French Patent No. 1,162,882 of Dec. 20, 1956.

For the formation of the catalytic system, the Compounds A can be mixed with the Compounds B before they are introduced into the reactor. The catalyst can thus be pre-formed and possibly "aged" in order then to be introduced into the mixture to be polymerised and in a continuous or intermittent manner. The Compounds A and B can also be introduced separately.

Preferably, the catalytic system comprises quantities of Compounds A and B such that the molar ratio of the metal of A to the transition metal of B is between 1 and 30.

The polmerisation is effected in the presence of a third solvent or even with an excess of one of the monomers for forming the liquid phase of the reaction medium. The solvents which can be used are the same as those which are normally employed in the polymerising and copolymerising of olefines, namely, aliphatic, cycloaliphatic or aromatic hydrocarbons, for example, heptane, cyclohexane, benzene, ethylbenzene or mixtures of such solvents. It is also possible to employ halogenated hydrocarbons which are neutral with respect to the catalyst, for example, chlorobenzene or tetrachlorethylene.

The copolymerisation is generally carried out between −80° C. and +110° C., the preferred range being from −30° to +50° C.

Although the pressures currently applied are of the order of 1 to 10 atm., it is possible and something necessary to work under higher or lower pressures. In particular, it may be advantageous to work at a temperature and a pressure such that one or more of the monomers present are liquid during the reaction and thus serve as distribution agent.

The unsaturated trithiane which is added according to the invention is generally introduced all at once into the reactor, as such or even in solution in a solvent, before the addition of the catalytic system. Nevertheless, it is possible to introduce all or part of this unsaturated compound during the polymerisation, in a continuous or intermittent manner.

The process according to the invention can be carried out continuously. According to this alternative the solvent, the monomers and the catalytic system are introduced continuously into a polymerisation zone, in such quantities that their residence time in this zone is sufficient to obtain the desired concentration of copolymers in the reaction mixture. In general, the necessary residence time decreases when the concentration of the monomers and of the catalysts in the supply mixture is increased.

In the new products according to the invention, and particularly in the terpolymers, the lower limit of the ethylene content is not a determining factor, but the upper limit should preferably be 75 mol percent in order to avoid a crystallinity of the polyethylenic type. As regards the content of α-olefine in the amorphous terpolymers, it can normally vary from 5 to 75 mol percent. The total content of trithiane in the terpolymer can vary from 0.1 to 20 mol percent. Generally speaking, the composition of the copolymers according to the invention can vary within wide limits as a function of those of the mixture of monomers.

The duration of the copolymerisation, which is primarily a function of the temperature and the nature of the catalytic system, generally varies between approximately 1 hour and 8 hours.

On completion of the operation, the catalyst is destroyed in known manner, the reaction medium is subjected to steam distillation in vacuo at a temperature from 30° to 60° C., with a view to eliminating the solvent and the untransformed monomers, and the copolymer which is obtained, or "gum," is finally dried in vacuo at about 40° C.

The gum thus obtained has a degree of unsaturation sufficient for being vulcanised by the conventional procedures which are applicable to unsaturated elastomers. This vulcanisation can be carried out with the means usual in the rubber industry.

The following example illustrates the invention, without limiting its scope.

*Example*

The reaction is carried out in a cylindrical glass reactor with an internal diameter of 10 cm. and having a capacity of 1,000 ml., the reactor being equipped with a stirrer device, a thermometer, two funnels for the introduction of the catalytic pair, a condenser with a gas outlet tube and a gas inlet tube which ends near the bottom of the reactor in a ring formed with several holes in order to permit a better diffusion of the gaseous mixture within the solvent.

The reactor is placed in a bath which is thermostatically controlled at 10° C.±1° C.

The gaseous monomers, freed from their harmful impurities, such as humidity and air, are mixed before being introduced into the reaction medium. Their quantities are controlled by rotameters and counters.

Into the reactor, which is kept under a stream of nitrogen, there are introduced 620 ml. of cyclohexane which has been dried and degasified beforehand and 1 g. of triethylidene trithiane.

The funnels are arranged above the reactor and they are also kept under nitrogen; 6 millimols of $VOCl_3$, brought to 60 ml. with cyclohexane, are introduced into one funnel, while 30 millimols of $(C_2H_5)_2AlCl$, diluted to 70 ml. with cyclohexane, are introduced into the other funnel. The flow of nitrogen is stopped and a gaseous mixture of ethylene and propylene, in the volumetric ratio between propylene and ethylene of 2:33, is sent into the reactor at the rate of 70 litres (at N.T.P.) per hour.

After five minutes, the propylene/ethylene ratio is brought to 0.5 and the constituents of the catalyst are introduced dropwise, so as to be completely injected in 30 minutes. The readings of the temperature and of the "inlet" and "outlet" counters every five minutes enable the reaction and the absorption to be followed.

The medium becomes viscous and it is generally limited to a polymer concentration of 1 to 6%.

When the absorption has ceased, after two hours, the flow of the gases is stopped and the catalyst is destroyed with 150 ml. of water. The reaction mixture is freed from the solvent by steam distillation in vacuo at about 50° C.

After drying in vacuo, 56 g. of a solid product having the appearance of an unvulcanised elastomer are obtained.

What is claimed is:

1. A substantially, linear, amorphous, unsaturated polymer of ethylene and a trithiane of the formula:

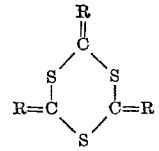

wherein R is an alkylidene group having 1 to 6 carbon atoms.

2. A polymer according to claim 1, wherein said polymer is formed of ethylene units, alpha olefin units and unsaturated trithiane units of the formula given in claim 1.

3. A polymer according to claim 1 wherein said polymer is formed of ethylene, propylene and an unsaturated trithiane of the formula given in claim 1.

4. Polymer according to claim 3, wherein the proportion of ethylene units is 5 to 75 moles percent and that of the unsaturated trithiane 0.1 to 20 moles percent.

5. Copolymer according to claim 4, hardened by heating with sulfur.

6. Copolymer according to claim 4, hardened by heating with a free radicals forming agent.

7. Process for the preparation of copolymers, which consists in polymerizing at −80° to +110° C. a mixture of at least one sort of olefine with an unsaturated trithiane of the formula

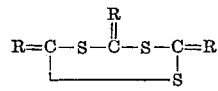

wherein R is an alkylidene group having 1 to 6 carbon atoms, in the presence of a Ziegler type catalyst (a system comprising an alkyl derivative of at least one metal of Groups I, II and III of the Periodic System of Elements, and a halide of at least one transition metal of groups IV, V and VI of the Periodic System), the molar proportion of the trithiane in said mixture being of 0.1 to 20 mole percent.

8. Process according to claim 7, wherein said mixture contains less than 75 moles percent of ethylene and 5 to 50 moles percent of propylene.

9. Process according to claim 7, wherein temperature is kept at −30° to +50° C. during the polymerization which is carried out under a pressure of 1 to 10 atmospheres.

10. Process according to claim 7, wherein said trithiane is triethylidene or trimethylene trithiane.

References Cited

UNITED STATES PATENTS 3,325,406   6/1967   Brannen et al. _____ 260—79.7

JOSEPH L. SCHOFER, *Primary Examiner.*

D. K. DENENBERG, *Assistant Examiner.*